(12) United States Patent
Veedu

(10) Patent No.: US 7,875,211 B1
(45) Date of Patent: *Jan. 25, 2011

(54) MULTIFUNCTIONAL CEMENTITIOUS NANOCOMPOSITE MATERIAL AND METHODS OF MAKING THE SAME

(75) Inventor: Vinod P. Veedu, Honolulu, HI (US)

(73) Assignee: Oceanit Laboratories, Inc., Honolulu, HI (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/660,051

(22) Filed: Feb. 19, 2010

Related U.S. Application Data

(63) Continuation of application No. 12/154,382, filed on May 22, 2008, now Pat. No. 7,666,327.

(60) Provisional application No. 60/931,195, filed on May 22, 2007.

(51) Int. Cl.
*H01B 1/18* (2006.01)
*H01B 1/04* (2006.01)
*C04B 35/057* (2006.01)

(52) U.S. Cl. .................. 252/506; 252/510; 252/511; 252/502; 501/90; 501/99; 106/717; 106/814

(58) Field of Classification Search .......... 252/506, 252/510, 511, 502; 501/90, 99; 106/717, 106/814
See application file for complete search history.

(56) References Cited

U.S. PATENT DOCUMENTS

| | | | |
|---|---|---|---|
| 6,911,260 B2 * | 6/2005 | Ren et al. ............... 428/408 |
| 7,666,327 B1 * | 2/2010 | Veedu ...................... 252/510 |
| 7,713,448 B1 * | 5/2010 | Veedu ...................... 252/506 |
| 2003/0004058 A1 * | 1/2003 | Li et al. .................... 502/258 |
| 2004/0234566 A1 * | 11/2004 | Qiu et al. .................. 424/401 |
| 2006/0029537 A1 * | 2/2006 | Zhang et al. ............. 423/447.1 |
| 2006/0039848 A1 * | 2/2006 | Matarredona et al. ..... 423/447.1 |
| 2006/0159916 A1 * | 7/2006 | Dubrow et al. ............. 428/357 |
| 2007/0077432 A1 * | 4/2007 | Nagasaki et al. ........... 428/407 |
| 2007/0128960 A1 * | 6/2007 | Ghasemi Nejhad et al. ... 442/59 |
| 2007/0142548 A1 * | 6/2007 | Nejhad et al. ............... 524/847 |
| 2007/0298168 A1 * | 12/2007 | Ajayan et al. ............. 427/249.1 |
| 2008/0277652 A1 * | 11/2008 | Mochizuki et al. ........... 257/40 |
| 2009/0039308 A1 * | 2/2009 | Gounko et al. ........... 252/62.54 |
| 2009/0229494 A1 * | 9/2009 | Shah et al. .................. 106/816 |

FOREIGN PATENT DOCUMENTS

WO   WO 2007010517 A1 *   1/2007

* cited by examiner

*Primary Examiner*—Douglas Mc Ginty
(74) *Attorney, Agent, or Firm*—James Creighton Wray; Meera P. Narasimhan

(57) ABSTRACT

A high performance multifunctional cementitious nanocomposite material is made by adding a nano admixture to the water used in a conventional cementitious material manufacturing process. The nano admixture is made by dispersing nanomaterials in a solvent and sonicating the mixture, adding a hydrophilic emulsifier, thickener, additive or cellulose derived compound to hot water, where it separates and expands, cooling the water, causing the compound to dissolve, and then adding the solvent and nanomaterial mixture to the water and mechanically mixing. The contact between the nanomaterials and the surrounding matrix changes with applied stress, affecting the volume electrical response of the finished nanocomposite material. By measuring the electrical resistance of the material, its structural health, as well as the stress applied to it, can be monitored. A bridge made with the material is monitored for structural integrity and for the weight, speed, and location of traffic over the bridge.

18 Claims, 5 Drawing Sheets

MULTIFUNCTIONAL CEMENTITIOUS NANOCOMPOSITE MATERIAL AND METHODS OF MAKING THE SAME

This application is a continuation of application Ser. No. 12/154,382, filed May 22, 2008, now U.S. Pat. No. 7,666,327, which claims the benefit of U.S. Provisional Application No. 60/931,195, filed May 22, 2007, which are hereby incorporated by reference in their entirety as if fully set forth herein.

FIELD OF THE INVENTION

The present invention relates in general to reinforced materials and in particular to reinforced cementitious composites for structural construction and methods of making such materials.

BACKGROUND OF THE INVENTION

Concrete is an essential material for building all types of infrastructure including buildings, roads, dams, etc. As for brittle materials in general, concrete is strong under compression and weak under tension or flexure and has the tendency to crack and has poor thermal conductivity. The exothermic reaction in the formation of concrete and the poor thermal conductivity of the materials in concrete pose a problem for large pours such as dams, where coolant systems must be built into the slabs for proper curing.

The use of steel or fiber (glass or carbon) reinforcements in concrete has major drawbacks. For example, steel fibers can only be used on surfaces that can tolerate or avoid corrosion and rust stains. In environments where the structure is exposed to rapid heating and cooling, the thermal mismatch between concrete and steel may introduce extensive spalling in concrete specimens because of pore pressure build up in regions of severe temperature gradients. Glass fiber is inexpensive and corrosion-proof, but not as strong as steel and will not increase the concrete tensile strength. Using carbon fibers in concrete adds complexity to the manufacturing process.

Approaches to monitoring the structural health of concrete using external sensors suffer due to many different technical complexities. External piezo-electric sensors and embedded sensors approaches require foreign materials to be either embedded or attached to the structure. This adds complexities in processing and is not cost-efficient for large applications. Also, the performance of these materials depends on the conditions of the surrounding environment. Short carbon fiber is not practical for large applications. Also, the electrical performance of the carbon fibers is not significant enough to produce feedback signals from the structure.

Carbon nanotubes are quasi-one dimensional, nearly single crystalline (axially), hollow, graphitic carbon structures. The combination of high aspect ratio, small size, excellent mechanical properties, low density, and high electrical conductivity make them perfect candidates as fillers in polymer composites. Experimental as well as theoretical predictions on nanotubes suggest an axial Young's modulus of 1 TPa.

These exciting properties make carbon nanotubes a greatly desired carbonaceous material that has wide range of applications for its extraordinary physical, chemical, and mechanical properties. However, carbon nanotubes' lack of proper dispersion and tendency to aggregate in aqueous environments prevent them from being used in many applications. As prepared nanotubes are insoluble in many liquids such as water, polymers etc. A good dispersion of the materials, preferably up to single nanotube level, is of critical importance in achieving the predicted exciting properties for nanotube reinforced, materials.

Needs exist for improved methods of reinforcing cementitious materials. Also, the recent catastrophic failures of civil structures, such as bridges, dams, levees, buildings, etc., echo the need for an in-situ monitoring of the health and integrity of structures.

SUMMARY OF THE INVENTION

This invention uses a process to create nano admixtures that transform traditional cementitious composite material, such as concrete, into multifunctional smart structural material (nanoconcrete) without adding any additional weight and without altering the manufacturing process. The process and materials are easy to scale up. Also, the nano admixture introduces ductility, durability and other multifunctionalities without sacrificing existing concrete properties. A cement concrete-carbon nanotube structure displays high tensile and flexural strengths and fracture toughness, low electrical resistivity, and high thermal conductivity and electromagnetic interference shielding effectiveness.

The present invention utilizes a nanomaterials based admixture for use in reinforcements and multifunctional performance of cementitious composites. The nanomaterials in the admixture may be graphitic or non-graphitic carbon materials or nanoparticles such as silicon carbide, dispersed and stabilized in water. The carbon material that is preferably used in this invention is carbon nanotube. The carbon nanotubes used may be single walled, multiple walled, as prepared or functionalized.

This invention uses a revolutionary but simple method for the effective and uniform dispersion of nanomaterials in water, up to single tube level. The nanomaterial suspension (nano admixture) remains stable for more than 3 months and does not experience significant degradation of physical or chemical characteristics. Co-pending application Ser. No. 11/904,247 describes this method in greater detail and is incorporated by reference herein in its entirety. This approach is of paramount importance in the use of nanomaterials in a variety of areas, including structural materials, paints, coatings, adhesives, electronics and optics.

The nano admixture-reinforced structural materials, such as cementitious composites, have smart materials characteristics and multifunctionalities. In contrast to other approaches, the nanoconcrete admixture does not alter the manufacturing process, is easy to incorporate in traditional concrete materials and to scale-up, and is cost effective. The newly developed nano admixture transforms traditional concrete material into multifunctional smart nanoconcrete without adding any additional weight.

This novel approach reforms traditional concrete into crack-resistant self monitoring multifunctional smart material. The addition of nanomaterials based admixture in concrete enhances mechanical properties, vibration damping capacity, air void content, permeability, steel rebar corrosion resistance, coefficient of thermal expansion, and workability. Also the nanomaterials admixture reinforced composite has improved alkali silica reaction inhibition properties.

The presence of nano-admixture in concrete will also result in significant improvements in the following: crack resistance, thermal conductivity, and fiber dispersion.

The many advantages of the present invention include:

Lower environmental impact—advanced concrete will result in higher-strength, less-volume, lighter-weight structures with lower $CO_2$ emissions Simplicity of use—builders/workers and other users will require no special training to manufacture NanoConcrete Safety—nanotubes and nanoparticles will be suspended and stabilized in a solution, mitigating safety risks for users In a new method of making a multifunctional cementitious nanocomposite material a prepared nano admixture comprising nanomaterials and water is provided, the prepared nano admixture is added to a measured amount of water to form nano admixture modified water, and the nano admixture modified water is used in place of ordinary water in a cementitious material manufacturing process.

As part of providing the prepared nano admixture, nanomaterials are dispersed in a solvent and the solvent with dispersed nanomaterials is sonicated. A hydrophilic emulsifier, thickener, additive or cellulose derived compound is added to hot water, separated and expanded in the water, and dissolved in the water. The solvent with dispersed nanomaterials is added to the water with dispersed hydrophilic emulsifier, thickener, additive or cellulose derived compound, and the combination of solvent with dispersed nanomaterials and water with dispersed hydrophilic emulsifier, thickener, additive or cellulose derived compound is mechanically stirred.

The hydrophilic emulsifier, thickener, additive or cellulose derived compound may be methylcellulose. The nano materials remain suspended and stabilized in the nano admixture for over three months, posing no significant safety risk to workers handling the admixture.

Cement and aggregates are provided and mixed together. The nano admixture modified water is mixed with the mixture of cement and aggregates to form a concrete. The concrete is placed in a mold, compacted, and cured. Chemical additives or fibers may be provided, and may be mixed with and at the same time as the cement and aggregates. Silica fume may be used as a dispersing or densifying agent.

A new multifunctional cementitious nanocomposite material is made by the method described above. The cementitious nanocomposite exhibits improved mechanical and chemical properties without significant additional weight compared to a corresponding conventional or carbon fiber reinforced cementitious material without nanomaterials. The nanomaterials give the material a smart structure with inherent sensor capabilities whereby structural health can be monitored.

The material displays high tensile and flexural strengths, fracture toughness, thermal conductivity, and electromagnetic interference shielding effectiveness and low electrical resistivity compared to corresponding conventional or carbon fiber reinforced cementitious material without nanomaterials. The material exhibits significantly improved crack resistance, vibration damping capacity, permeability, air void content, steel rebar corrosion resistance, coefficient of thermal expansion, thermal conductivity, fiber dispersion, and workability compared to corresponding conventional or carbon fiber reinforced cementitious material without nanomaterials.

The material has improved alkali silica reaction inhibition properties compared to corresponding conventional or carbon fiber reinforced cementitious material without nanomaterials. The nanomaterials reduce the permeability of the material, preventing the ingress of water. The nanomaterials strengthen the interfacial transition zones in the material, acting as tiny mechanical rebar to suppress the effects of alkali silica reaction.

The sensor capabilities of the material include a change in volume electrical response depending on applied stress, whereby strain on the material can be detected by measuring its electrical resistance. Roads are paved with such a material, the material's electrical resistance at different points is measured, and the measurements are used to determine the location, weight, and speed of traffic.

The nanomaterials may comprise carbon nanotubes and reduce pores and prevent micro-cracking by fiber-bridging across micro crack regions. The carbon nanotubes form a stitching on fracture surfaces, diverting crack energy into a matrix and inhibiting crack propagation. The negative coefficient of thermal expansion of the carbon nanotubes results in a higher thermal stability for the material.

These and further and other objects and features of the invention are apparent in the disclosure, which includes the above and ongoing written specification, with the drawings.

DETAILED DESCRIPTION OF THE INVENTION

In this invention, carbon nanotubes were stabilized and uniformly dispersed in water using a simple but novel procedure. The same procedure can be used to achieve stable and uniform dispersions of all types of carbon nanotubes (single walled, multiple walled, as prepared, functionalized, long or short) and other types of nanomaterials, such as nanoparticles, buckyballs, nanoclays etc. in water or in a matrix material derived from a metal, ceramic, polymer, or combination thereof.

Figure 7:
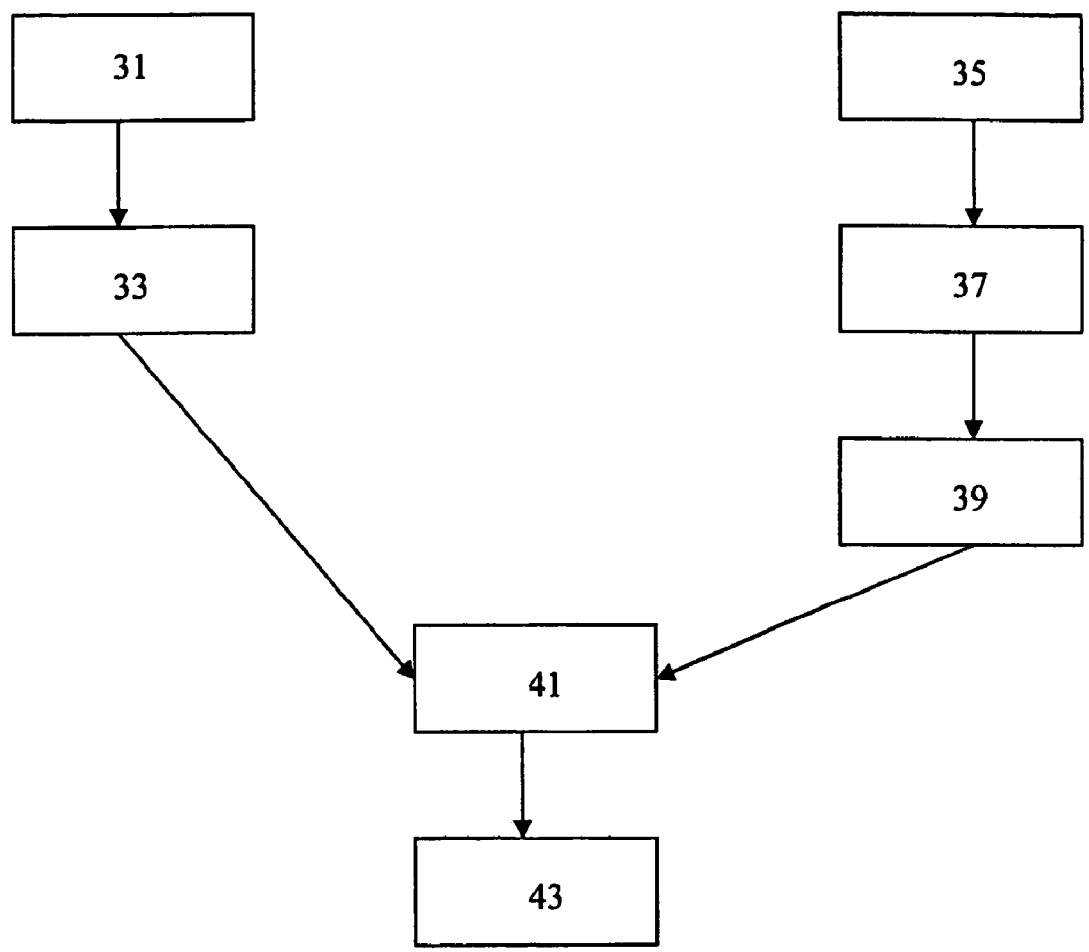
FIG. 7 is a diagram illustrating a method of creating a nano admixture.

One example of a method for properly dispersing carbon nanotubes in water in shown in FIG. 7. A hydrophilic emulsifier, thickener, additive or cellulose derived compound such as methylcellulose is added to hot water 35 where it separates and expands 37 with a temperature of about 80-90 degree Celsius. Methylcellulose swiftly dissolves 39 when the water cools down. This solution is stable. Prior to this process, carbon nanotubes are dispersed in a solvent (preferably acetone or an alcohol such as ethanol) 31 and sonicated 33. This nanotube dispersed solvent is then added to the methylcellulose dispersed water 41 and mechanically stirred 43, uniformly dispersing the nanotubes in the mixture. The resulting mixture remains stable and uniform for months after preparation. The amount of nanotubes in the dispersion may vary from 0.00001-90% by weight.

Figure 1:
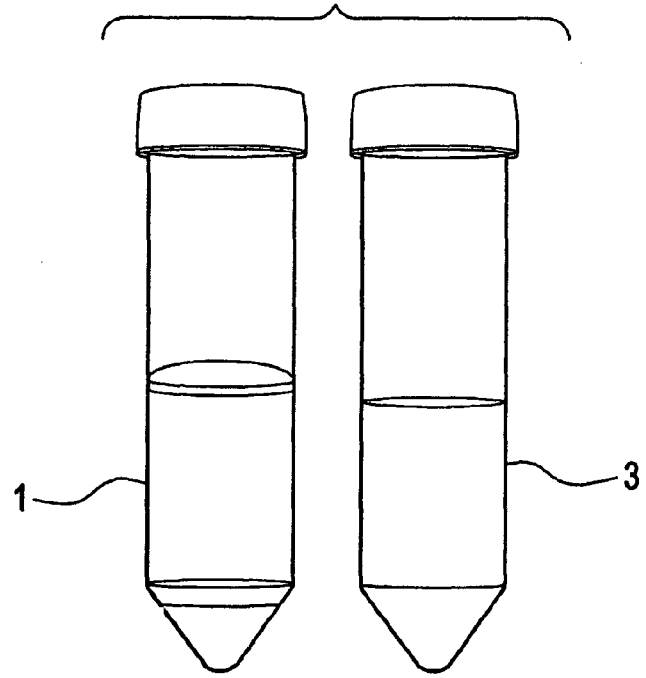
FIG. 1 is a photograph showing the dispersion of carbon nanotubes in water.

FIG. 1 is a photograph showing the dispersion of carbon nanotubes in water. Simple nanotube water dispersion 1 has experienced near-complete separation and precipitation of the nanotubes after only ten to fifteen minutes. Nanotube water dispersion created using the method of the present invention 3 is still uniform two months after preparation.

The nanotube dispersion in water (nano admixture) projects applications in many different areas including structural materials, bio-medical applications, electronics, optics, paint, adhesive and coating materials. In fact the dispersion method is applicable to any application that requires water stabilized carbon nanotubes. The application of the water suspended nanotubes (nano admixture) was successfully demonstrated in enhancing the properties of cementitious materials such as concrete. Thus produced concrete is called Nanoconcrete.

Figure 8:
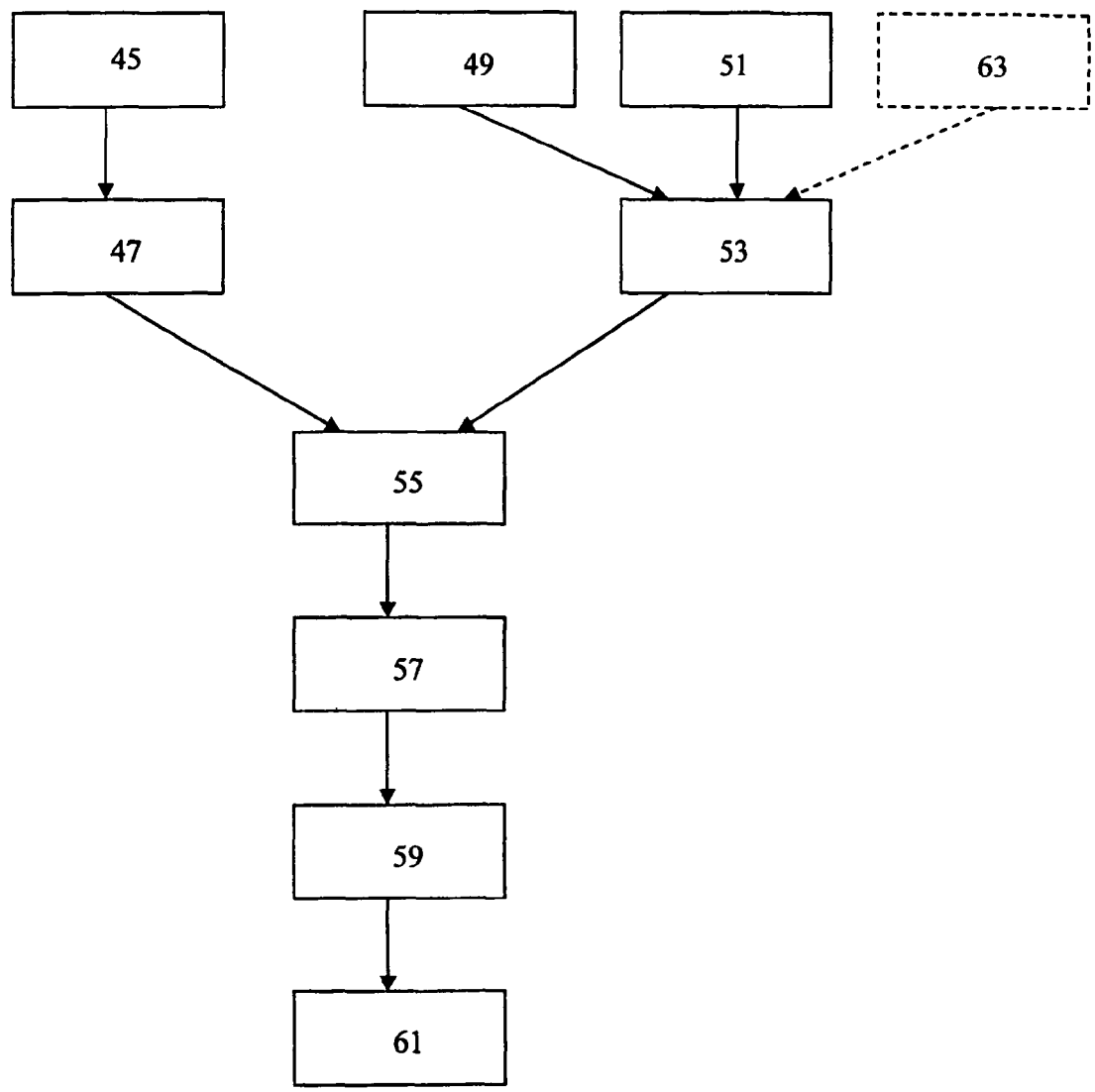
FIG. 8 is a diagram illustrating a method of creating nanoconcrete.

Once the nano admixture is prepared, the manufacture of nanoconcrete is fairly simple and can be adapted to any traditional approach for making concrete. One example of the method is shown in FIG. 8. In general, the processes and materials involved are as follows: Cement, aggregates, and optionally chemical additives or fibers are provided 49, 51, 63. The cement, and other ingredients—aggregates (such as sand or gravel), chemical additives, and any necessary fibers—are mixed together with the cement 53 for about 15 mts. The previously prepared nano admixture is provided 45 and is then added to the measured amount of water used for the concrete 47. The nano admixture modified water is then mixed with the cement aggregate mixture to form concrete 55. In the case of nanoconcrete, the admixture will contain nanoparticles. Silicon carbide nanoparticles may also be incorporated in the nano admixture.

The concrete is then placed in the mold 57, compacted 59, and cured 61. The mixing operation uses rotation or stirring to coat the surface of the aggregate with cement paste and to blend the other ingredients uniformly. A variety of batch or continuous mixers may be used. Fibers (such as glass, carbon etc.), if desired, can be added by a variety of methods including direct spraying, premixing, impregnating, or hand laying-up. Carbon fiber reinforced concrete—without nano admixture—is called CFRC. Silica fume may also be used as a dispersing or densifying agent.

Figure 2:
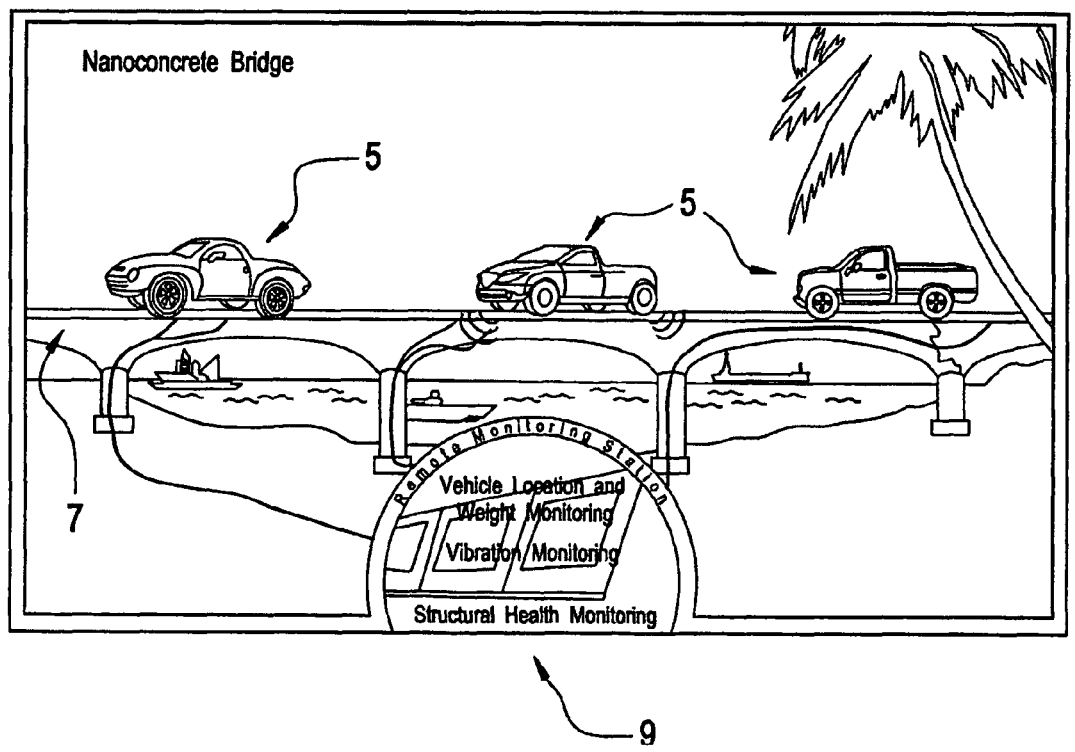
FIG. 2 is an illustration of the potential applications of nano admixture incorporated cementitious nanocomposite materials.

FIG. 2 illustrates the potential applications of nano admixture incorporated concrete. Along with enhanced mechanical properties, the concrete has inherent properties for self-monitoring of health. The nanoconcrete has enhanced physical & chemical performance and crack resistance with built-in structural health monitoring and multifunctional, "smart" characteristics. Smart structures offer a novel way to monitor the health of critical structures that undergo severe wear and tear—like concrete bridges. While preventing structural damage caused by dynamic loading is addressed at a bridge's structural level, normal reinforced concrete lacks the ability to deter crack formation.

Another potential application for a NanoConcrete smart material is in the creation of smart highways that will potentially track the location, weight and speed of traffic. The basic concept in self health monitoring is that concrete modified with nano additives becomes a very sensitive detector of strain which is proportional to the stress and can be detected through measurement of electrical resistance. Depending on the applied stress, the contact between the CNTs and the cement matrix changes; this, in turn, affects the volume electrical response of the concrete. To prevent catastrophic failure, advanced detection of defects and health monitoring in brittle materials such as concrete is extremely desirable. These qualities also give the potential for using the NanoConcrete as a sensor material, possibly making many embedded detectors obsolete.

Figure 3:
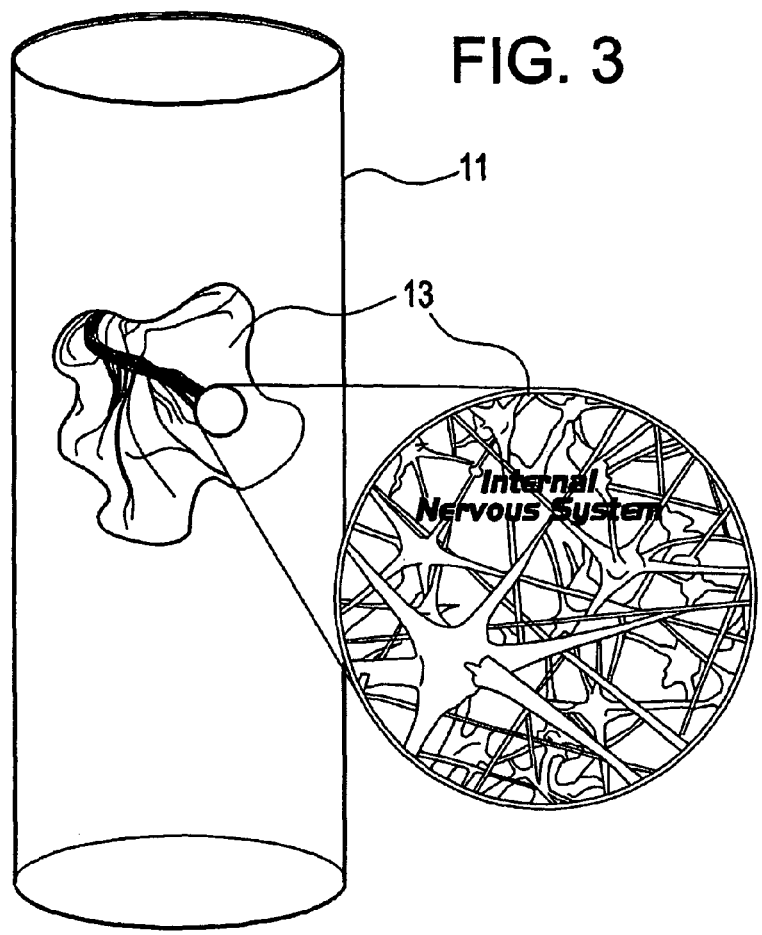
FIG. 3 is a schematic showing a carbon nanotube based network acting as a "nervous system" in concrete.

FIG. 3 illustrates a combination of these two applications in a NanoConcrete bridge. The bridge 7, including its surface, is made of a smart NanoConcrete material. As vehicles 5 travel along the surface over the bridge, a remote monitoring station 9 measures changes in the electrical properties of the material. The remote monitoring station can detect both the structural health of the bridge and the location, weight, and speed of passing vehicles 5.

The nano admixture also helps to reduce the impact of Alkali-Silica Reaction (ASR) in concrete. ASR is the chemical reaction involving certain forms of silica present in the aggregates and the hydroxide ions (OH) in the pore water of concrete, producing a gel that expands and creates tensile forces in the concrete matrix and causes cracking of the concrete. The cracking attracts more water to infiltrate the concrete, creating more gel and expansion which eventually leads to disintegration or failure of the concrete.

The carbon nanotubes or any other nano materials (such as silicon carbide nanoparticles) in the nanoconcrete are well known chemically inert materials and are not expected to participate in any chemical reaction leading to ASR. The formulation modifies the nanomaterials surfaces to enhance the properties of the concrete without participating in the chemical reaction. In fact, the silicon carbide (SiC) nanoparticles suppress the deleterious expansion due to ASR. The lowered permeability caused by nanoparticles and nanotubes will prevent the ingress of water. The swelling associated with ASR is thought to be induced by the ASR gel absorbing water. Also, the presence of SiC nanoparticles will act to strengthen the interfacial transition zones in the concrete. In this way, the nanomaterials act as tiny mechanical "rebar" to suppress the effects of ASR.

The nanoconcrete may perform as well as or better than steel reinforced concrete. The concentration and ratio of nanotubes and nanoparticles can be adjusted depending on the specific application, scenario and environment. Also, the use of structural reinforcement in concrete can depend on many different parameters including the locations for the concrete applications. Depending on the application and design requirements, the nano admixture-based concrete may be used with limited or no conventional reinforcements, especially in small-load applications and in highly corrosive environments. The nanoconcrete can also be used with significantly lower (or no) conventional reinforcements such as steel or fiber reinforcements.

As shown in FIG. 3, the carbon nanotubes 13 in the nanoconcrete 11 form a nano network that enhances the integrative and sensory functions of the concrete. Uniformly dispersed CNTs in concrete help reduce pores and prevent micro-cracking by "fiber-bridging" across micro crack regions. Because CNTs have a negative coefficient of thermal expansion, CNTs incorporated mixtures should have a higher thermal stability. Also, CNTs incorporated concrete (nano-concrete) has a self structural health monitoring potential, making it a smart material system.

In one experiment, the mechanical performance of the manufactured CFRC and Nanoconcrete were measured and compared. The measured flexural strengths and compression strengths indicate significant improvements in the properties of concrete due to the presence of nano admixture. Standards ASTM C 39 and C 78 were followed for testing compressive strength of cylindrical concrete specimens and flexural strength of concrete, respectively. The table below compares the mechanical performances of CFRC and Nanoconcrete as to flexural and compressive strength.

| Type of Concrete | Flexural Strength (MPa) | Compression Strength (MPa) |
| --- | --- | --- |
| CFRC | 2.42 | 14 |
| Nanoconcrete | 3.2 | 26.8 |

From the measured properties, it merits mention that the flexural and compressive strengths of the nanoconcrete are 30% and 100% greater, respectively, than that of CFRC.

Figure 4:
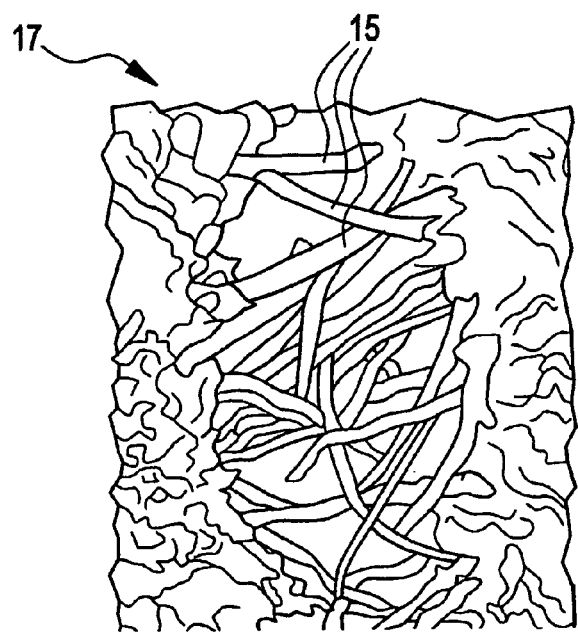
FIG. 4 is a scanning electron micrograph (SEM) showing the failure mechanisms in cementitious nano admixture reinforced concrete.
Figure 5:
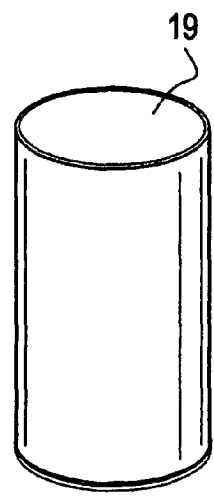
FIG. 5 is a photograph of a finished block of manufactured nanoconcrete.
Figure 6:
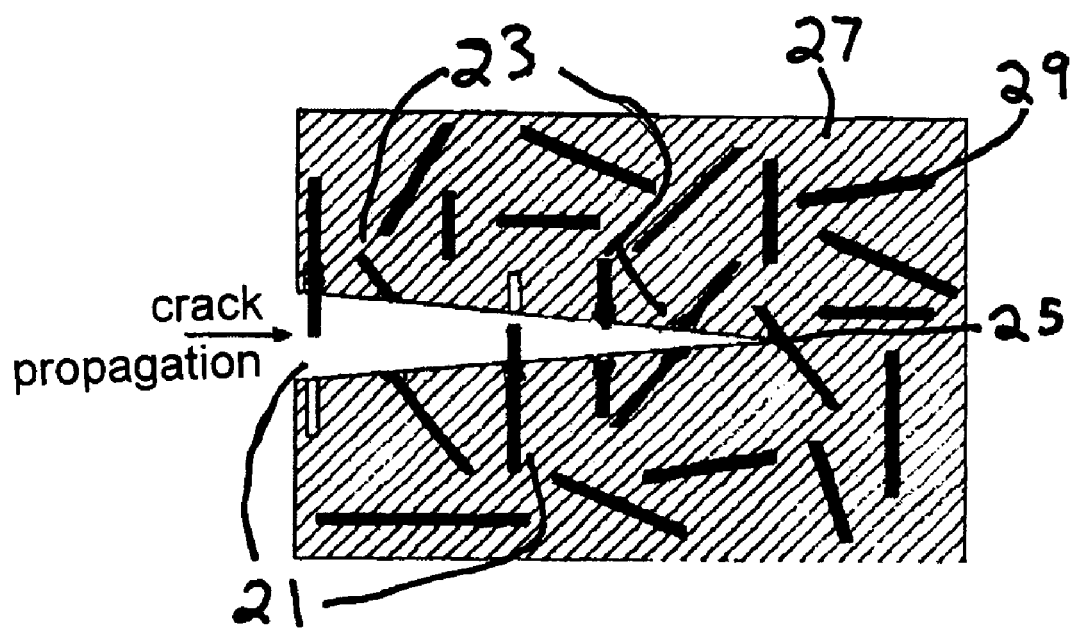
FIG. 6 is a diagram showing the failure mechanisms of carbon-fiber-reinforced cement.

FIG. 6 shows the failure mechanisms of carbon-fiber-reinforced cement. As a crack propagates, Carbon fibers 29 in concrete 27 pull out 21 of the surrounding cement material, rupture 23, or debond 25. Investigating the reasons for the improved mechanical performances of the nanoconcrete, microscopic analysis was performed. FIG. 4 shows the scanning electron micrograph (SEM) showing the failure mechanisms in nanoconcrete. Carbon nanotubes inhibit crack propagation by diverting crack energy into the matrix, yielding good strength and toughness during the fracture process. The enhanced properties of the nanoconcrete may be attributed to the microstructure modifications due to the presence of nanomaterials. The fracture surface of the nanoconcrete 17 showed a "stitching" effect due to nanotubes 15. A finished block of Nanoconcrete 19 manufactured using the nano admixture is shown in FIG. 5.

Like in the case of high performance reinforced cementitious composites, the properties predictions for the design of nanoconcrete stems from the principles of micromechanics, which relate macroscopic mechanical properties to the microstructure of the composite. Given the properties of the constituent phases, micromechanics can predict the full multi-axial properties and response of composite material. The benefit is that the behavior of the composite can be determined without resorting to testing the composite, which can be expensive given the large number of permutations.

In another experiment, the thermal performance of the manufactured CFRC and Nanoconcrete were measured and compared. Thermal conductivity, a material property, does not differ with the dimensions of a material, but is dependent on the temperature, the density and the moisture content of the material. The thermal conductivity test was performed according to the specifications of ASTM E1530 Test Method. The estimated accuracy for this test is ±5%.

| Type of Concrete | Temperature (°C.) | Thermal Conductivity (W/mK) |
| --- | --- | --- |
| CFRC | 32.7 | 1.1 |
| Nanoconcrete | 32.6 | 1.5 |

The thermal conductivity of unreinforced concrete is typically 0.8 W/mK. As shown in the Table above, the thermal conductivity of nanoconcrete is at least 35% and 85% greater than that of CFRC and unreinforced concrete, respectively.

While the invention has been described with reference to specific embodiments, modifications and variations of the invention may be constructed without departing from the scope of the invention.

I claim:

1. A method of making a multifunctional cementitious nanocomposite material, comprising:
   dispersing nanomaterials in a solvent,
   sonicating the solvent with dispersed nanomaterials,
   adding the solvent with dispersed nanomaterials to hot water,
   mechanically stirring the combination of solvent with dispersed nanomaterials and water to form a prepared nano admixture,
   adding the prepared nano admixture to a measured amount of water to form nano admixture modified water, and
   using the nano admixture modified water in place of ordinary water in a cementitious material manufacturing process.

2. The method of claim 1, wherein the nano materials remain suspended and stabilized in the nano admixture for over three months, posing no significant safety risk to workers handling the admixture.

3. The method of claim 1, further comprising providing cement, providing aggregates, and mixing together the cement and aggregates, wherein the using the nano admixture modified water in place of ordinary water in a cementitious material manufacturing process comprises mixing the nano admixture modified water with the mixture of cement and aggregates to form a concrete.

4. The method of claim 2, further comprising placing the concrete in a mold, compacting the concrete, and curing the concrete.

5. The method of claim 2, further comprising providing chemical additives or fibers, wherein the mixing together the cement and aggregates further comprises mixing the chemical additives or fibers with the cement and aggregates.

6. The method of claim 3, further comprising using silica fumes or other nanoparticles as a dispersing or densifying agent.

7. A multifunctional cementitious nanocomposite material made by the method of claim 1, wherein the cementitious nanocomposite exhibits improved mechanical and chemical properties without significant additional weight compared to a corresponding conventional or carbon fiber reinforced cementitious material without nanomaterials.

8. The material of claim 7, wherein the nanomaterials give the cementitious nanocomposite material a structure with inherent sensor capabilities whereby structural health can be monitored.

9. The material of claim 8, wherein the sensor capabilities comprise a change in volume electrical response depending on applied stress, whereby strain on the material can be detected by measuring its electrical resistance.

10. The material of claim 7, wherein the material displays high tensile and flexural strengths, fracture toughness, thermal conductivity, and electromagnetic interference shielding effectiveness and low electrical resistivity compared to corresponding conventional or carbon fiber reinforced cementitious material without nanomaterials.

11. The material of claim 7, wherein the material exhibits significantly improved crack resistance, vibration damping capacity, permeability, air void content, steel rebar corrosion resistance, coefficient of thermal expansion, thermal conductivity, fiber dispersion, and workability compared to corresponding conventional or carbon fiber reinforced cementitious material without nanomaterials.

12. The material of claim 7, wherein the material has improved alkali silica reaction inhibition properties compared to corresponding conventional or carbon fiber reinforced cementitious material without nanomaterials.

13. The material of claim 12, wherein the nanomaterials reduce the permeability of the material, preventing the ingress of water.

14. The material of claim 12, wherein the nanomaterials strengthen the interfacial transition zones in the material, acting as tiny mechanical rebar to suppress the effects of alkali silica reaction.

15. A method of using the material of claim 9, comprising paving roads with the material, measuring the material's electrical resistance at different points, and using the measurements to monitor traffic.

16. The material of claim 7, wherein the nanomaterials comprise carbon nanotubes, wherein the carbon nanotubes reduce pores and prevent micro-cracking by fiber-bridging across micro crack regions.

17. The material of claim 16, wherein the carbon nanotubes form a stitching on fracture surfaces, diverting crack energy into a matrix and inhibiting crack propagation.

18. The material of claim 16, wherein the negative coefficient of thermal expansion of the carbon nanotubes results in a higher thermal stability for the material.

\* \* \* \* \*